United States Patent [19]

Pearce et al.

[11] Patent Number: 5,101,688
[45] Date of Patent: Apr. 7, 1992

[54] DRIVELINE ENGAGEMENT/DISENGAGEMENT

[75] Inventors: Shairyl I. Pearce, Lititz, Pa.; David J. Rutkowski, Grosse Ile, Mich.; John H. Tanzer, Troy, Mich.; Rudolf Beim, Southfield, Mich.

[73] Assignee: Ford New Holland, Inc., New Holland, Pa.

[21] Appl. No.: 710,363

[22] Filed: Jun. 3, 1991

[51] Int. Cl.$^5$ .............................................. B60K 41/08
[52] U.S. Cl. .................................... 74/861; 74/856; 192/3.58; 192/3.62
[58] Field of Search .................... 74/844, 856, 861; 192/3.55, 3.57, 3.58, 3.61, 3.62; 364/424.1

[56] References Cited

U.S. PATENT DOCUMENTS

| | | | |
|---|---|---|---|
| 4,350,058 | 9/1982 | Miller et al. | 74/861 X |
| 4,430,911 | 2/1984 | Morscheck | 74/861 X |
| 4,843,902 | 8/1989 | Patton et al. | 74/335 |
| 4,855,913 | 8/1989 | Brekkestran et al. | 74/866 X |
| 4,967,385 | 10/1990 | Brekkestran et al. | 74/866 X |
| 4,989,470 | 2/1991 | Bulgrien | 74/866 X |
| 5,012,416 | 4/1991 | Bulgrien et al. | 74/866 X |
| 5,043,892 | 8/1991 | Brekkestran et al. | 74/866 X |

OTHER PUBLICATIONS

Versatile Model 936/976 Tractor Operators Manual, Ford New Holland, 1987.
4-Wheel-Drive Tractors from John Deere "Break New Ground-Shatter Old Limits".

Primary Examiner—Leslie A. Braun
Assistant Examiner—William O. Trousdell
Attorney, Agent, or Firm—Griffin, Branigan & Butler

[57] ABSTRACT

In a transmission system having range shift levers mechanically linked to couplers and shiftable between first and second positions to select ranges of gears and electro-hydraulic powershift clutches for selecting a gear within the range selected by the range shift lever, the powershift clutches are located on each side of at least one of the couplers, between the input shaft and the coupler and between the output shaft and the coupler. A dump solenoid is controlled by operation of a clutch pedal to release fluid from the powershift clutches as the clutch pedal is depressed but before it reaches the fully depressed position so that the coupler is not being driven when coupler shifting takes place. A microprocessor is responsive to shifting of the range shift levers to control energization of the powershift clutches so that when one or more of the shift levers is shifted the lowest powershift gear is selected if the new lever positions will produced a higher gear range and the highest powershift gear is selected if the new lever positions select a lower gear range.

10 Claims, 9 Drawing Sheets

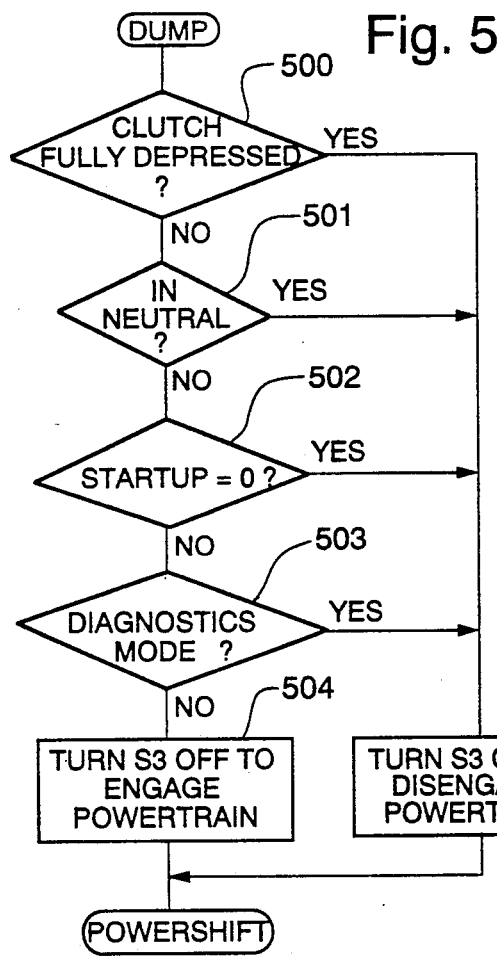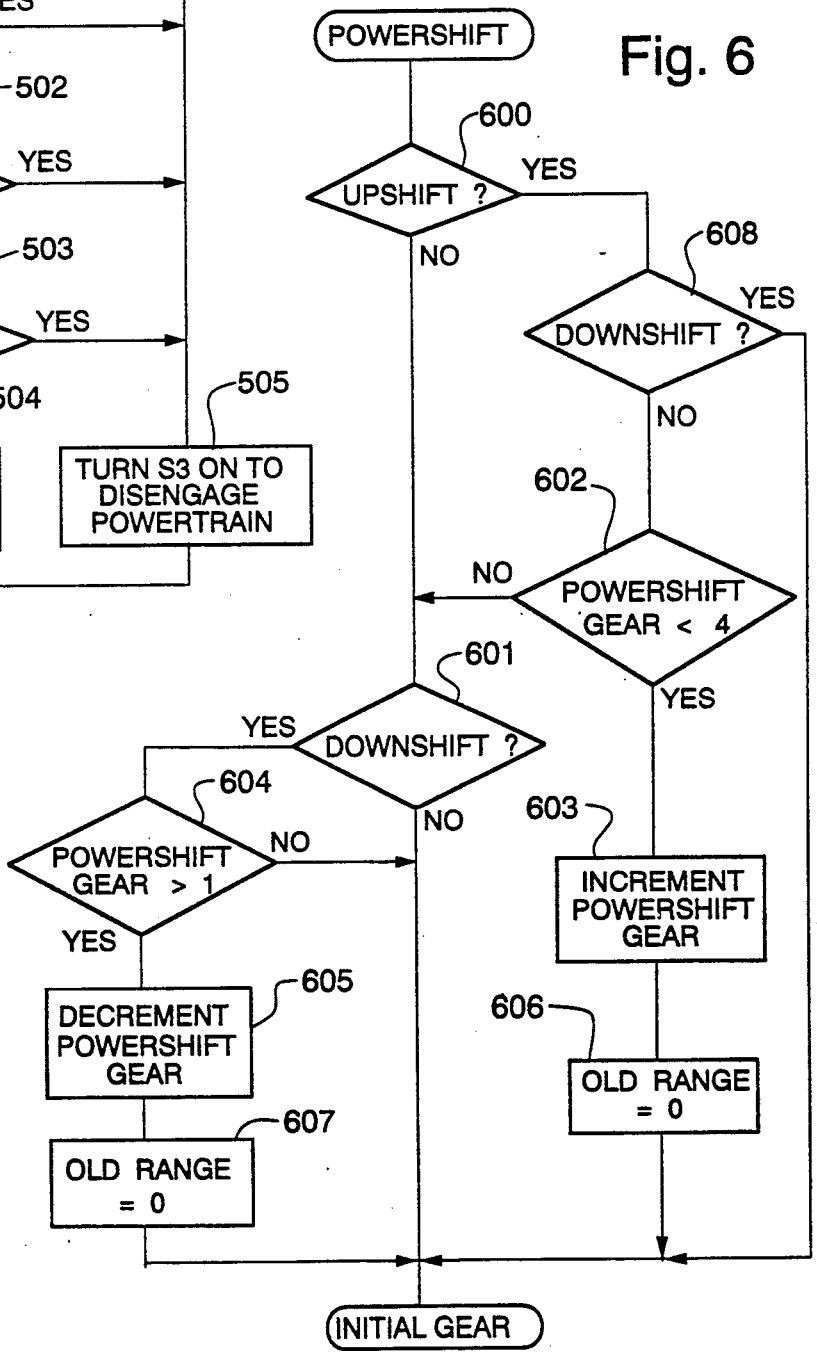
Fig. 5
Fig. 6

DRIVELINE ENGAGEMENT/DISENGAGEMENT

RELATED APPLICATIONS

This application discloses subject matter also disclosed and claimed in the following concurrently filed applications:

Application F Ser. No. 07/709,187 entitled Transmission System With Single Lever Coupler and Powershift Control Application G-1 Ser. No. 07/709,629 entitled Transmission and Start-Up Control Application G-2 Ser. No. 07/710,360 entitled Transmission Speed Matching Control Application H-1 Ser. No. 07/709,188 entitled Creeper Gear Engagement/Disengagement

BACKGROUND OF THE INVENTION

The present invention relates to improvements in microprocessor controlled transmission systems of the type employing both mechanical shifting of couplers and powershift clutch control to effect gear speed selection. More particularly, the present invention relates to improvements in transmission systems to reduce the magnitude of speed changes during range shifting, reduce the possibility of sudden changes in speed, and reduce synchronizer wear.

Transmission having both mechanically shifted couplers and powershift clutches are well known in the art. These transmissions can be designed to provide a wide range of gear speed ratios between the input and output shafts and are well adapted for use in off-road vehicles such as agricultural tractors. The above-referenced applications disclose such a transmission having two range select levers which shift two synchronized couplers to select ranges of gears and two powershift control buttons for controlling solenoid actuated electro-hydraulic clutches to select one of four gears within the selected range.

In a transmission having both mechanically shifted couplers and powershift clutches, a sudden acceleration or deceleration occurs when a range select lever is shifted from one range to another. For example, if a range select lever selects the gear range 1–4 in one position and gear range 5–8 in a second position, shifting of the range select lever results in a change of four gears, i.e. gear 1 to gear 5 or gear 2 to gear 6, etc., because the selected powershift gear does not change. If the second range select lever controls gear selection between the ranges 1–8 and 9–16, a shift of this lever produces a change of eight gears and the acceleration or deceleration is even greater. Such accelerations/decelerations are highly undesirable because they have a tiring effect on the operator, result in more wear on the transmission, particularly the coupler synchronizers, and reduce the ability to precisely control the vehicle speed. In accordance with one aspect of the present invention, movement of a range shift lever controls powershift gear selection so that when the lever is moved from a low to a high range position the lowest powershift gear is selected and when the lever is moved from a high to a low range position the highest powershift gear is selected. This provides a smoother shift and reduces synchronizer wear.

In accordance with a second aspect of the invention, synchronizer wear is further reduced by placing at least one electro-hydraulic powershift clutch between the transmission input shaft and the synchronized couplers and, as a clutch pedal is depressed in preparation for a range shift, releasing the fluid from the hydraulic clutch before the clutch pedal is fully depressed. This disconnects the input shaft prior to the time the synchronized shift is initiated. Thus, a lower shift effort is required and viscous drag of the transmission gears in the wet sump begins slowing rotation of the gears prior to the time the synchronized shift takes place.

SUMMARY OF THE INVENTION

An object of the present invention is to provide a method and apparatus for controlling a transmission so as to reduce to a minimum the change in gear speed ratio when a range shift is made.

Another object of the invention is to provide a method and apparatus for controlling powershift gear selection upon shifting of a coupler from one gear range to another, the lowest powershift gear being selected when the coupler is shifted from a low range to a high range and the highest powershift gear being selected when the coupler is shifted from the high range to the low range.

A further object of the invention is to provide a method and apparatus as described above for use in a system having two shiftable couplers, the second coupler being shiftable between a first lower and second higher range. In this case, if one or both levers are shifted, the highest powershift gear is selected if the new lever position(s) will produce a lower gear range, and the lowest powershift gear is selected if the new lever position(s) will produce a higher gear range.

Still another object of the invention is to provide a transmission system wherein at least one electro-hydraulic powershift clutch is located between the transmission input shaft and one or more synchronized couplers, and means responsive to movement of a clutch pedal are provided for releasing fluid from the powershift clutches as the clutch pedal is depressed but before it reaches a fully depressed position at which synchronized shifting takes place. When more than one powershift clutch is provided, the second powershift clutch is located between the synchronized coupler and the output shaft of the transmission.

Other objects of the invention and its mode of operation will become apparent upon consideration of the following description and the accompanying drawings.

BRIEF DESCRIPTION OF THE DRAWINGS

FIG. 5 illustrates a routine for controlling the dump solenoid;

FIG. 6 illustrates a routine for controlling powershift gear selection;

DETAILED DESCRIPTION OF THE INVENTION

Figure 1:
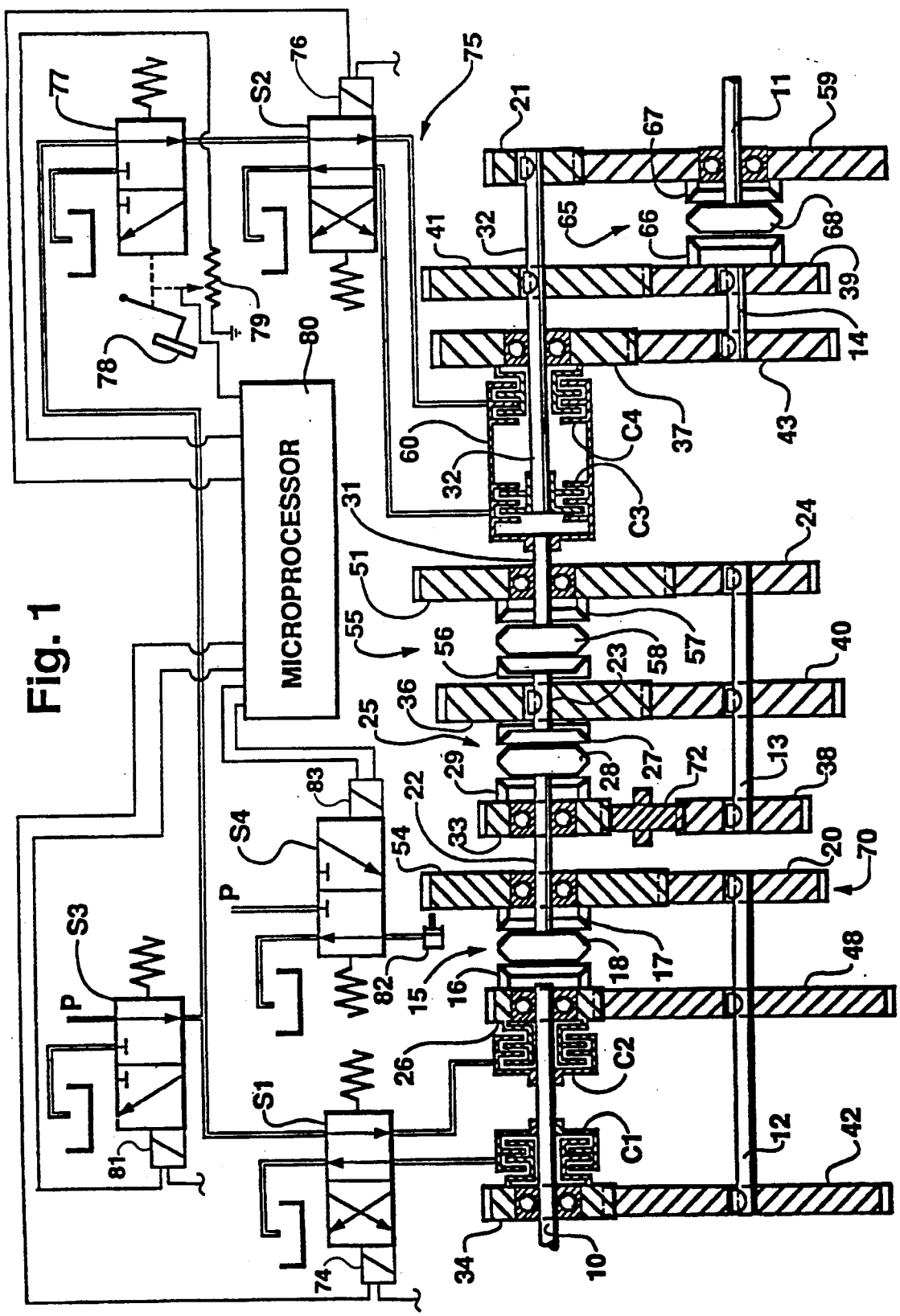
FIG. 1 is a schematic representation of a transmission and its controls.

FIG. 1 is a schematic representation of a microprocessor controlled transmission system for transmitting torque from an input shaft 10 to an output shaft 11 at any one of 16 forward or 16 reverse gear speed ratios. The input shaft 10 receives rotational power directly from an engine (not shown) in a conventional manner. A first drive gear 34 is rotatably mounted on the input shaft 10 for rotation independently thereof. The first drive gear 34 is operatively connected with a first hydraulic clutch C1 mounted on the input shaft 10 such that engagement of the first clutch C1 couples the first drive gear 34 to the input shaft 10 for rotation therewith. Disengagement of the first clutch C1 allows the first drive gear 34 to rotate freely on the input shaft 10. Similarly, a second drive gear 26 is rotatably mounted on the input shaft 10 and operatively connected to a second hydraulic clutch C2 to permit a selective coupling of the second drive gear 26 to the input shaft 10 for rotation therewith upon engagement of the second clutch C2.

A first jack shaft 12 is rotatably supported in the transmission casing (not shown) in a parallel orientation to the input shaft 10. A first transfer gear 42 and a second transfer gear 48 are mounted on the first jack shaft 12 for rotation therewith. The first transfer gear 42 is meshed with the first drive gear 34 to be rotatable therewith, while the second transfer gear 48 is meshed with the second drive gear 26 to be rotatable therewith. A first drive member 16 of a coupler 15 is fixed to the second drive gear 26 to be rotatably driven therewith.

In operation, rotational power is transferred to the first drive member 16 of the coupler 15 from the engine along one of two alternate drive paths, providing two speeds of rotation for a given engine output rotation of the input shaft 10. The first drive path provides the slower rotational speed by engagement of the second hydraulic clutch C2 to directly couple the second drive gear 26 to the input shaft 10. The second drive path involves a disengagement of the second clutch C2 and an engagement of the first hydraulic clutch C1 to couple the first drive gear 34 to the input shaft 10. Rotational power is transferred to the intermeshed first transfer gear 42 and to the second transfer gear 48, due to the fixed mounting thereof on the first jack shaft 12, and then to the second drive gear 26 which is rotatable relative to the input shaft 10 to drive the coupler drive member 16 at a faster speed than the speed obtained by directly coupling the second drive gear 26 to the input shaft 10.

The coupler 15 is an optional device associated with the provision of a "creeper" range. In the event a creeper mechanism 70 is not utilized, the shiftable power transfer member 18 of the coupler 15 is connected directly to the first drive member 16 of the coupler 15 to provide direct driving rotation of a first drive shaft portion 22 and a shiftable power transfer member 28 of a second (Forward/Reverse) coupler 25, which is preferably a synchronizing coupler. A reverse drive gear 33 is rotatably mounted on the first drive shaft portion 22 for rotation independently thereof, but is operatively associated with the second synchronizing coupler 25 to provide a selection by the operator between forward and reverse operation of the output shaft 11, as will be described in greater detail below. For purposes of describing the operation of the transmission, the power transfer member 28 of the second synchronizing coupler 25 is deemed to be engaged with the second drive member 27 to effect a direct coupling of the first drive shaft portion 22 with the second drive shaft portion 23 and, thereby effect a normal forward operative driving of the transmission.

The second drive shaft portion 23 is provided with a third drive gear 36 affixed thereto for rotation therewith. The third drive gear 36 is drivingly intermeshed with a third transfer gear 40 affixed to a second jack shaft 13 rotatably supported in the transmission casing in a parallel orientation with the second drive shaft portion 23. A fourth transfer gear 24 is also fixed to the second jack shaft 13 for rotation with the third transfer gear 40. A fourth drive gear 51 is rotatably supported on a third drive shaft portion 31 for rotation independently thereof. The fourth drive gear 51 is intermeshed with the fourth transfer gear 24 for a driving relationship therebetween.

A third (4/5) coupler 55, preferably a synchronizing coupler, drivingly interconnects the second drive shaft portion 23 and the third drive shaft portion 31. A first drive member 56 of the synchronizing coupler 55 is connected to and associated with the second drive shaft portion 23, while a second drive member 57 of the coupler 55 is connected to and operatively associated with the fourth drive gear 51. A shiftable power transfer member 58 is connected to the third drive shaft portion 31 and is selectively engageable with either the first or second drive members 56, 57 of the third coupler 55 to effect a transfer of rotational power along a selected one of two alternate paths of rotational power.

Rotational power received by the third drive gear 36 from the driving connection between the first and second drive shaft portions 22, 23 can be transferred to the third drive shaft portion 31 via a first drive path defined by the interengagement of the shiftable power transfer member 58 and the first drive member 56 of the third synchronizing coupler 55 to directly couple the second and third drive shaft portions 23, 31. The alternate drive path is selected when the shiftable power transfer member 58 is selectively engaged with the second drive member 57 of the third coupler 55. Rotational power is transferred along this alternate drive path to the third drive shaft portion 31 from the third drive gear 36 to the third transfer gear 40 which, due to the fixed relationship between the third transfer gear 40, the second jack shaft 13, and the fourth transfer gear 24, transfers rotational power to the fourth transfer gear 24 and then to the intermeshed fourth drive gear 51. Since the fourth drive gear 51 is drivingly coupled to the third drive shaft portion 31 via the engagement of the power transfer member 58 and the second drive member 57 of the third coupler 55, the third drive shaft portion 31 is rotated at a slower rotational speed via this alternate drive path for a given rotational speed of the second drive shaft portion 23 than the direct coupling of the second and third drive shaft portions 23, 31.

The third drive shaft portion 31 is connected to the housing or drive half of a clutch pack 60 housing two separate clutches, a third hydraulic clutch C3 and a fourth hydraulic clutch C4. The third clutch C3 is connected to a fourth drive shaft portion 32 such that the engagement of the third hydraulic clutch C3 drivingly couples the third and fourth drive shaft portions 31, 32. The fourth hydraulic clutch C4 is connected to a fifth drive gear 37 rotatably mounted on the fourth drive shaft portion 32 for rotation independently thereof, such that the engagement of the fourth hydraulic clutch C4 drivingly couples the third drive shaft portion 31 to the fifth drive gear 37. Obviously, the third and fourth clutches C3, C4 cannot be simultaneously actuated.

Accordingly, two additional alternate drive paths are provided through the selection afforded by the clutch pack 60. The first of these drive paths is the direct coupling of the third and fourth drive shaft portions 31, 32 through actuation of the third hydraulic clutch C3. The second of these alternate drive paths utilizes actuation of the fourth hydraulic clutch C4 to drivingly couple the third drive shaft portion 31 to the fifth drive gear 37, which transfers rotational power to a fifth transfer gear 43 intermeshed with the fifth drive gear 37 and affixed to a third jack shaft 14. A sixth transfer gear 39 is also affixed to the third jack shaft 14 for rotation coextensively with the fifth transfer gear 37. The sixth transfer gear 39 is meshed with a sixth drive gear 41 affixed to the fourth drive shaft portion 32 to effect rotation thereof when the fourth clutch C4 is actuated.

A fourth (High/Low Range) coupler 65, preferably a synchronizing coupler, provides a final pair of alternate drive paths for rotational power to be transferred to the output shaft 11. The fourth synchronizing coupler 65 includes a first drive member 66 connected to the sixth transfer gear 39 to be rotational with the fifth and sixth transfer gears 43, 39 and the third jack shaft 14, a second drive member 67 connected to and rotatably associated with a seventh transfer gear 59 rotatably mounted on the output shaft 11 to be rotatable independently thereof, and a shiftable power transfer member 68 connected to the output shaft 11 to be rotatable therewith.

A seventh drive gear 21 is also affixed to the fourth drive shaft portion 32 to be rotatable therewith and with the sixth drive gear 41. The first of these two final alternate paths of rotational power transfer is defined by a direct coupling of the shiftable power transfer member 68 to the first drive member 66 of the fourth coupler 65 to drivingly couple the rotation of the sixth transfer gear 39 to the output shaft 11. The final alternate drive path is defined by an engagement of the shiftable power transfer member 68 with the second drive member 67 of the fourth coupler 65 so that the output shaft 11 is driven from the seventh transfer gear 59 which is intermeshed with the seventh drive gear 21 receiving rotational power from the drive fourth drive shaft portion 32. Because of the relative sizes of the seventh drive and transfer gears 21, 59, the output shaft 11 is driven at a slower rotational speed for a given speed of rotation of the fourth drive shaft portion 32 when the output shaft 11 is coupled to the seventh transfer gear 59 rather than the sixth transfer gear 39, which may alternatively receive rotational power from either the driven sixth drive gear 41 or the fifth transfer gear 43 via the driven fifth drive gear 37.

Figure 2:
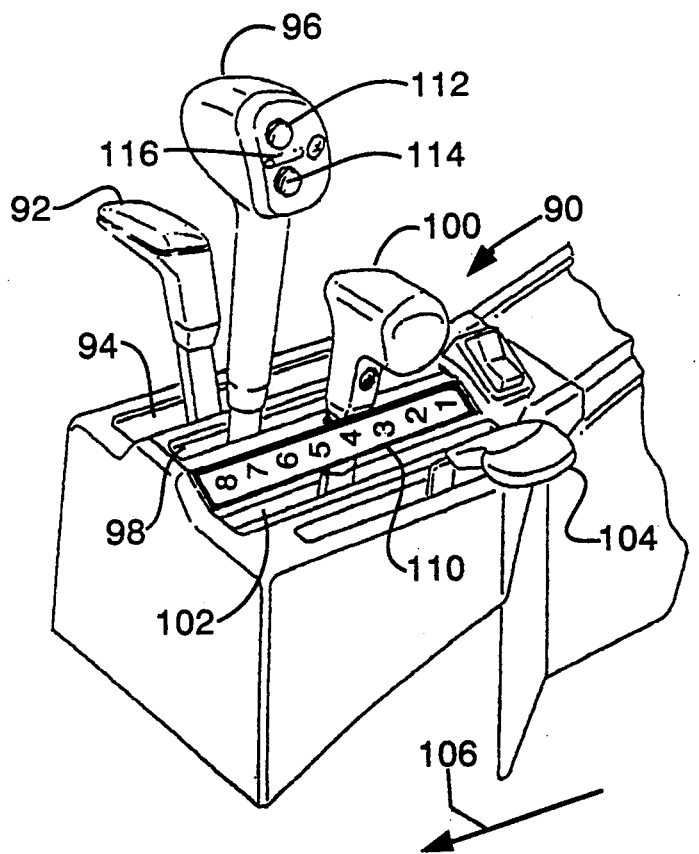
FIG. 2 illustrates the operator controls for controlling the transmission.

Referring to FIG. 2, the operator controls for the transmission are located on a console 90 positioned to the right of the operator as he sits in seat (not shown) facing forwardly in the direction indicated by arrow 106. The operator controls include a High/Low shift lever 92 movable in a plane extending vertically through a slot 94, a Main or 4/5 shift lever 96 movable or shiftable in a plane extending vertically through a slot 98, and a Forward/Neutral/Reverse (FNR) shift lever 100 movable in a slot 102. A throttle lever 104 is also provided on the console for controlling engine speed.

The High/Low shift lever 92 is connected through a mechanical linkage (not shown) to the High/Low coupler 65 and is shiftable between a low (L) position whereat transfer member 68 of coupler 65 is engaged with the seventh transfer gear 59 and a high (H) position whereat transfer member 68 is engaged with the sixth transfer gear 39.

The 4/5 shift lever 96 is connected through a mechanical linkage (not shown) to the 4/5 coupler 55 and is shiftable between a "4" position whereat the transfer member 58 of the 4/5 coupler 55 engages the fourth drive gear 51 and a "5" position whereat transfer member 58 engages the second drive shaft portion 23.

The FNR shift lever 100 is connected through a mechanical linkage (not shown) to the Forward/Reverse coupler 25 and is shiftable between a forward position (F) whereat transfer member 28 of coupler 25 engages the second drive member 27 and a reverse position (R) whereat transfer member 28 engages the first drive member 29. In FIG. 2, a portion of the FNR shift lever is broken away to fully show a display 110.

The levers 92, 96 and 100 all have a neutral or out-of-gear center position but the neutral of the FNR lever 100 is considered to be the system neutral.

The 4/5 shift lever 96 is provided with an Up-Shift push-button 112 and a Down-Shift push-button 114 for powershifting between gears within ranges selected by the High/Low shift lever 92 and the 4/5 shift lever 96. The push-buttons are positioned on one side of shift lever 96 so that an operator may use the thumb of one hand to selectively actuate the push-buttons while still maintaining a grip on the lever. A ridge or raised portion 116 on the side of the shift lever enables an operator to "find" a thumb position on a desired push-button without actually looking to see which push-button he is touching.

The push-buttons actuate switches and provide input signals to a microprocessor 80. The microprocessor includes a counter (not shown) which is incremented by one for each actuation of the Up-Shift push-button 112 and decremented by one for each actuation of the Down-Shift push-button 114. The counter is constrained to the count range 1–4 and each count defines a powershift gear selection. The count in the counter determines which clutch is actuated in each of the clutch pairs C1, C2 and C3, C4, as subsequently explained.

One skilled in the art will readily realize from the above description that the transmission, without benefit of the creeper mechanism 70 described below, provides 16 different forward rotational speeds of the output shaft 11 for a given rotational speed of the input shaft 10. These 16 speed variations are accomplished by alternate drive paths provided by (1) the choice between the first and second hydraulic clutches C1 and C2 as determined by the powershift gear selected by push-buttons 112, 114; (2) the engagement of the mechanically shifted third coupler 55 as determined by the 4/5 shift lever 96; (3) the choice between the third and fourth hydraulic clutches C3 and C4 also as determined by the powershift gear selected by push-buttons 112, 114; and (4) the engagement of the mechanically shifted fourth coupler 65 as determined by the position of the High/Low shift lever 92. The sixteen alternative torque transmitting paths should be obvious to one skilled in the art from the foregoing description. Table I indicates typical ratios of input to output shaft speed for various positions of the 4/5 shift lever 96, the High/Low shift lever 92, and the selected powershift gear.

| Range Levers | | Powershift | Gear | |
|---|---|---|---|---|
| 4/5 | High/Low | Gear/Clutches | Display | Ratio |
| 4 | Low | 1 C2, C4 | 1L | 8.51 |
| 4 | Low | 2 C2, C3 | 2L | 6.97 |
| 4 | Low | 3 C1, C4 | 3L | 5.69 |
| 4 | Low | 4 C1, C3 | 4L | 4.66 |
| 5 | Low | 1 C2, C4 | 5L | 3.60 |
| 5 | Low | 2 C2, C3 | 6L | 2.95 |
| 5 | Low | 3 C1, C4 | 7L | 2.41 |
| 5 | Low | 4 C1, C3 | 8L | 1.97 |
| 4 | High | 1 C2, C4 | 1H | 2.74 |
| 4 | High | 2 C2, C3 | 2H | 2.25 |
| 4 | High | 3 C1, C4 | 3H | 1.84 |
| 4 | High | 4 C1, C3 | 4H | 1.50 |
| 5 | High | 1 C2, C4 | 5H | 1.16 |
| 5 | High | 2 C2, C3 | 6H | 0.95 |
| 5 | High | 3 C1, C4 | 7H | 0.78 |
| 5 | High | 4 C1, C3 | 8H | 0.64 |

From Table I, several observations may be made. The High/Low shift lever 92 permits the operator to select a low range of speeds 1L-8L or a high range of speeds 1H-8H. The 4/5 shift lever 96 divides each of these ranges into two sub-ranges designated the 4 range and the 5 range each having four possible speeds. Within each sub-range, the Up-Shift and Down-Shift push-buttons may be utilized to select one of the four speeds within the sub-range.

Returning now to the creeper mechanism 70, an additional 16 speeds of rotation of the output shaft 11 (8 forward and 8 reverse) for a given speed of rotation of the input shaft 10 can be obtained. The creeper mechanism 70 is an optional device. If the creeper mechanism 70 is not desired, the shiftable power transfer member 18 of the first coupler 15 is directly connected to the first drive member 16 so that the power transfer member 18 cannot be shifted out of engagement with the first drive member 16. The creeper mechanism 70 includes a creeper drive gear 54 rotatably mounted on the first drive shaft portion 22 to be rotatable independently thereof. The creeper drive gear 54 has a second drive member 17 of the first coupler 15 affixed thereto. A creeper transfer gear 20, smaller than the creeper drive gear 54, is affixed to the first jack shaft 12 for rotation with the first jack shaft 12 and the first and second transfer gears 42, 48, and placed in intermeshing relationship with the creeper drive gear 54. A spring (not shown) normally biases the creeper drive gear 54 and drive member 17 out of engagement with the power transfer member 18.

The creeper mechanism 70 is activated by actuating a piston 82 as described below which acts against the gear 54 to move drive member 17 into engagement with the power transfer member 18 of the first coupler 15. Instead of rotational power being transferred to the first drive shaft portion 22 via the second drive gear 26, rotational power is transferred from the first jack shaft 12 to the creeper transfer gear 20 and to the intermeshed creeper drive gear 54, and then to the first drive shaft portion 22 through the coupler 15. In instances where the first clutch C1 is engaged, rotational power is transferred from the input shaft 10 to the first drive gear 34, the first transfer gear 42, and the first jack shaft 12 so that the intermeshed second drive gear 26 and second transfer gear 48 are rotated without effect. When the second clutch C2 is engaged, rotational power reaches the first jack shaft 12 via the second drive gear 26 and the intermeshed second transfer gear 48, so that the first drive gear 34 is rotated on the input shaft 10 without effect by the driven first transfer gear 42.

The creeper mechanism 70 is actuated by operating a switch 170 (FIG. 3) associated with the operator controls. The microprocessor 80 may respond to operation of the switch to cause actuation of piston 82 only if certain conditions are present as subsequently described.

The reverse operating capabilities of the transmission are actuated by an engagement of the shiftable power transfer member 28 with the first drive member 29 of the second coupler 25, rather than the second drive member 27. This is accomplished through a mechanical linkage by moving the FNR lever 100 (FIG. 2) to the reverse (R) position. Rotational power received by the first drive shaft portion 22, whether via the second drive gear 26 or the creeper drive gear 54, is then transferred through the second coupler 25 to the reverse drive gear 33. A reverse transfer gear 38 is affixed to the second jack shaft 13 for rotation therewith. A reversing idler 72 is rotatably supported from the transmission casing (not shown) for intermeshing engagement with both the reverse drive gear 33 and the reverse transfer gear 38. As a result, the direction of rotation of the second jack shaft 13 is reversed when power is transferred through the reverse drive gear 33, when compared to the rotation of the second jack shaft 13 when power is transferred thereto from the third drive gear 36.

In operation, the second coupler 25 controls the forward/reverse operation of the transmission in response to movement of the FNR lever 100. When the shiftable power transfer member 28 is engaged with the second drive member 27 of the second coupler 25, the output shaft 11 is rotated in a normal forward direction of rotation. Shifting the power transfer member 28 to the first drive member 29 of the second coupler 25 effects a transfer of rotational power from the first drive shaft portion 22 to the reverse drive gear 33, which in turn transfers the rotational power through the reversing idler 72 to the reverse transfer gear 38 to rotate the second jack shaft 13 in the opposing direction to that described above with respect to the normal forward operation of the transmission. The rotational power is then transferred from the third transfer gear 40 to the intermeshed third drive gear 36 to cause rotation of the second drive shaft portion 23 in a reverse direction.

Although all the transmission components "downstream" of the second drive shaft portion 23 will then rotate in the opposite direction to that described above with respect to the normal forward operation of the transmission, ultimately causing the output shaft 11 to rotate in a normal reverse direction, all of the gear selection alternatives noted above are equally applicable when the reverse drive gear 33 has been engaged. Accordingly, the output shaft 11 of the transmission is capable of operation at 16 different speeds in both the forward and reverse modes. Furthermore, when the creeper mechanism 70 is actuated, gear ratios are increased by a factor of about 5.08 times those shown in Table I. The microprocessor 80 prevents actuation of the creeper mechanism when the High/Low shift lever 92 selects the high range. Thus, the creeper mechanism provides 8 additional forward gear speed ratios and 8 additional reverse gear speed ratios making a total of 24 available gear speed ratios in each direction.

The control system 75 for the transmission involves both mechanical and hydraulic control mechanisms, as well as the microprocessor 80 for automatic control of the hydraulic control mechanisms. As noted above, the couplers 25, 55 and 65 can be shifted mechanically through conventional linkages by means of shift levers 92, 96 and 100. The hydraulic powershift clutches C1 and C2 are controlled through a first electro-hydraulic solenoid valve S1 actuated by a solenoid 74, while the other pair of hydraulic powershift clutches C3 and C4 is controlled through a second electro-hydraulic valve S2 actuated by a solenoid 76. Both valves S1 and S2 are two position spool valves that direct a flow of hydraulic fluid to a selected one of the hydraulic clutches in a pair. As a result, both clutches in each pair of hydraulic clutches cannot be simultaneously actuated. FIG. 1 depicts the positions of valves S1 and S2 when their solenoids 74 and 76 are not energized. Solenoids 74 and 76 are controlled by microprocessor 80 in response to actuation of the Up-Shift and Down-Shift push-buttons 112, 114 and movement of the range shift levers 92 and 96 as subsequently described.

The control system 75 further includes a modulating hydraulic valve 77 that is operatively connected to the clutch pedal 78 of the tractor (not shown). The modulating valve 77 controls the flow of hydraulic fluid to the second solenoid valve S2 in response to the position of the clutch pedal 78, such that the amount of hydraulic fluid sent to the clutch pack 60 through the second solenoid valve S2 varies proportionately with the position of the clutch pedal 78 between a fully depressed and a fully released position. As a result, the torque carrying capability of the hydraulic clutches C3 and C4 can be feathered for a smooth start-up operation of the transmission in transferring rotational power from the input shaft 10 to the output shaft 11, particularly under load conditions.

The control system 75 also includes an electrohydraulic dump valve S3 which is actuated by a solenoid 81 and controls the flow of hydraulic fluid to the hydraulic valves S1, S2 and 77. The valve S3 is shown in the position it occupies when solenoid 81 is not energized. A shifting of the dump valve S3 to the "dump" position (solenoid 81 energized) releases fluid from the hydraulic clutches C1, C2, C3 and C4 and places the transmission in a "neutral" condition. The microprocessor 80 is operatively associated with the solenoids of all the two position solenoid valves S1, S2, S3 and S4 to control the positioning thereof and the direction of flow of hydraulic fluid to/from the powershift clutches C1, C2, C3 and C4. The clutch pedal 78 is operatively connected to a potentiometer 79 which in turn is connected to the microprocessor 80 to serve as a position sensor for the clutch pedal 78.

When the clutch pedal 78 reaches a threshold position, it acts through valve 77 to release substantially all the hydraulic pressure from the clutch pack 60. The threshold position (FCLUTCH THR) is spaced from the fully depressed position by about 12% of the distance between the fully released and fully depressed clutch pedal positions. When the microprocessor 80 senses that the clutch pedal has been depressed to position FCLUTCH THR it actuates the dump valve S3 to release fluid from all the hydraulic clutches C1, C2, C3 and C4. This minimizes wear on the gear synchros during a shift since the synchros are completely de-coupled from the engine during the shift. Furthermore, the 4/5 coupler 55 and the FNR coupler 25, which are the most frequently used, are decoupled from the output shaft 11.

The creeper mechanism 70 is actuated through a separate creeper hydraulic valve S4 operatively connected to a hydraulic piston 82 effective to shift the first coupler 15 as described above. The creeper hydraulic valve S4 is actuated by a solenoid 83 that is controlled by microprocessor 80. The dump valve S3 must be dumped to place the transmission in a "neutral" position to permit the non-synchronized first coupler 15 to shift as smoothly as possible. Release of the creeper mechanism 70 is effected by a spring (not shown) when the microprocessor 80 deenergizes solenoid 83 so that fluid in the cylinder for piston 82 may flow out to the sump. One skilled in the art will readily realize that the creeper solenoid valve S4 is not operatively associated with the dump valve S3 so that the piston 82 can be shifted even when the dump valve S3 is in the "dump" position.

Briefly, the microprocessor 80 may be a type 8061 microprocessor of the type used by Ford Motor Company for automotive control. The microprocessor includes analog to digital converter input channels and a frequency input channel in addition to digital inputs. It also includes a power supply responsive to the tractor battery voltage for producing a regulated +5 V voltage. In addition to the usual ROM and RAM memories and data processing circuits the microprocessor includes a "keep-alive" RAM powered directly from the tractor battery so that data in the memory is not lost when the tractor ignition switch is turned off.

Figure 3:
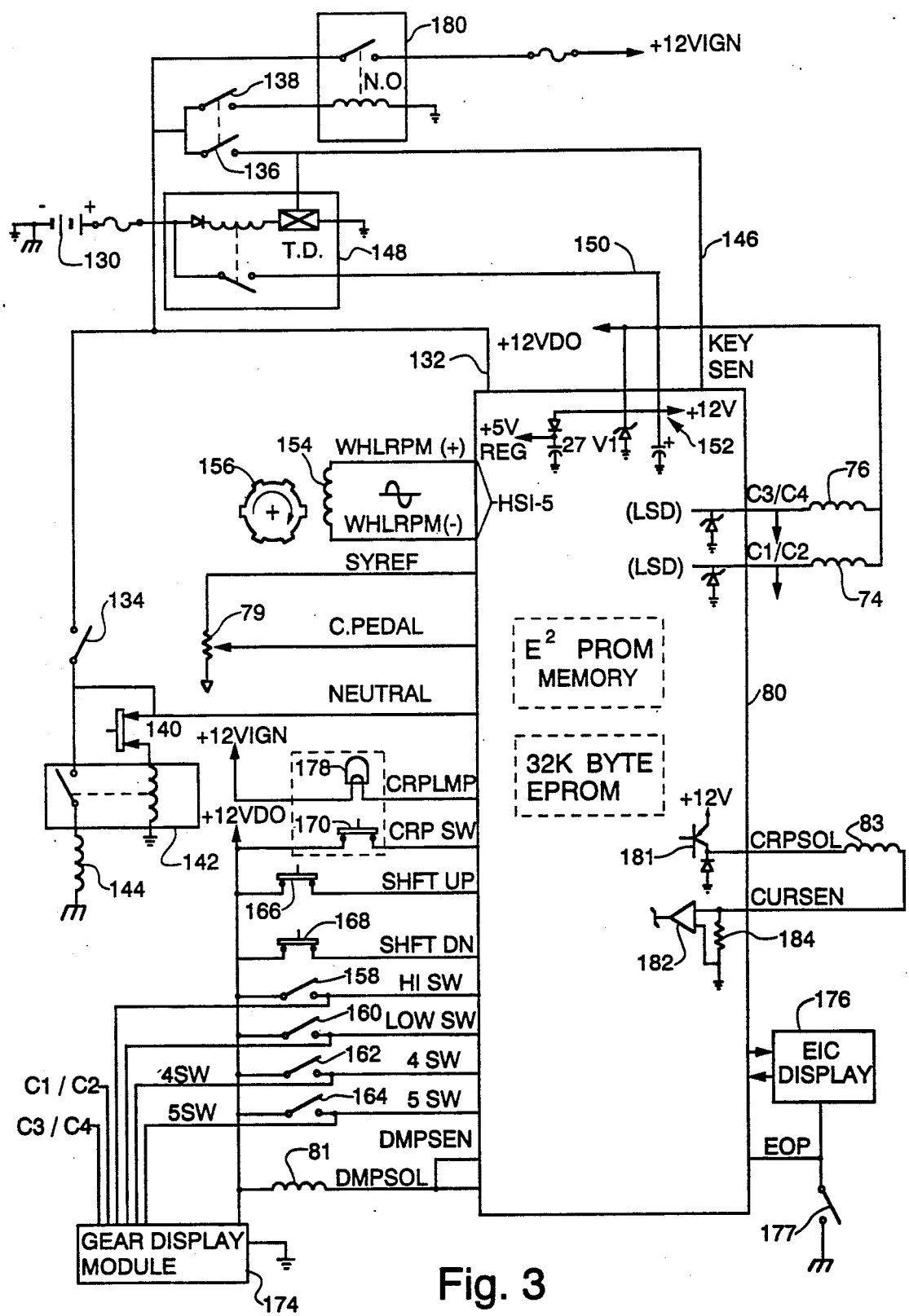
FIG. 3 is a schematic wiring diagram illustrating inputs to and outputs from a microprocessor controlling the transmission.

Referring now to FIG. 3, the tractor battery 130 is directly connected to the microprocessor 80 via a lead 132 to power the keep-alive memory. The battery is also connected to three sets of ignition switch contacts 134, 136 and 138. Switch contacts 134 are closed only when the ignition key is turned to the "crank" position. The FNR lever 100 (FIG. 2) controls a switch 140 and closes the switch when the lever is in the neutral position. If the lever 100 is in neutral when the ignition key is turned to the crank position, a start relay 142 is energized. The start relay closes its normally open contacts thus establishing a circuit from the battery through the ignition switch contacts 134 and the contacts of relay 142 to an engine starter coil 144. After the tractor engine starts, the operator releases the ignition key and it moves to a "run" position to open contacts 134.

Switch contacts 136 and 138 remain closed when the ignition key is released to the run position. When contacts 136 are closed they apply battery voltage to a data input of the microprocessor 80 over lead 146 and to a time delay relay 148. When the relay 148 is energized it closes its normally open contacts so that the battery voltage +12 VDO appears on lead 150. The relay 148 remains energized for about 8 seconds after ignition switch contacts 136 are opened so that power is available to microprocessor 80 and the solenoids 74, 76, 81 and 83 for this interval after the ignition key is turned to its "off" position.

The voltage +12 VDO is applied to one end of solenoids 74 and 76 which control the valves S1 and S2, respectively. These solenoids are selectively energized by the microprocessor 80 by selectively connecting the other ends of the solenoids to ground through a low-side driver (not shown).

When +12 VDO is applied to the microprocessor 80 the power supply circuits 152 therein generate the regulated voltage +5 V for powering the circuits within the microprocessor. The +5 V is continuously applied to the clutch pedal potentiometer 79 as the signal SVREF and the output signal from the potentiometer is applied to one of the analog input channels of the microprocessor.

The frequency input of microprocessor 80 is connected to a sensor 154 which senses the teeth on a gear 156. The gear is affixed to the transmission output shaft 11 and as the tractor moves sensor 154 produces an output signal to the microprocessor, the frequency of the output signal being proportional to the ground speed of the tractor.

In addition to shifting the couplers 25, 55 and 65 as described above, movement of levers 92, 96 and 100 also causes actuation of switches to provide input signals to the microprocessor indicating the positions of the switches. The High/Low shift lever 92 closes a High switch 158 when the lever is in the H position and a Low switch 160 when it is in the L position. The 4/5 lever 96 closes a "4" switch 162 when it is in the "4" position and a "5" switch 164 when it is in the "5" position. Switches 158, 160, 162 and 164 may be ball switches operated by sliding movement of the transmission shift rail (not shown) as the rail is moved by one of the levers 92 or 96.

When the FNR lever 100 is in the neutral position it closes the switch 140. As described above, switch 140 must be closed in order to start the engine which drives the transmission input shaft 10.

The Up-shift and Down-Shift push-buttons 112, 114 located on the 4/5 lever 96 control closure of two switches 166 and 168, respectively. These are momentary switches in that the microprocessor 80 senses for a change in the level of the signals it receives from these switches. This may be accomplished by saving each sampling of a switch and comparing it with the next succeeding sampling.

Associated with the operator controls is a creeper switch having contacts 170. The creeper switch is also a momentary switch which toggles between creeper gear engagement and dis-engagement provided that conditions are right for entry into, or exit from, the creeper mode. An open-to-closed transition of the creeper switch contacts 170 is sensed by microprocessor 80 to initiate entry into, or exit from, the creeper mode.

The switch contacts 158, 160, 162, 164, 166, 168 and 170 are connected to +12 VDO so that the switches are "alive" for eight seconds after the ignition switch is turned off. In addition to applying signals to the microprocessor 80, the switch contacts 158, 160, 162 and 164 are connected to a gear display module 174. The module 174 includes logic responsive to the conditions of the 4/5 shift lever switches 162 and 164, and the states of the signals C1/C2 and C3/C4 produced by microprocessor 80 to energize the clutch valve solenoids 74 and 76, and to control the lighting of one of the numerals 1 through 8 on the strip display 110 (FIG. 2). This display may comprise eight lamps backlighting a translucent panel bearing the numerals.

The display module also receives a signal when either of the switches 158 or 160 is closed. One of these switches must be closed, that is, the High/Low lever 92 must not be in neutral, for the display 110 to be lighted.

Although there are 16 forward or reverse gear speeds, the display 110 displays only eight speeds. The reason for this is explained below. A separate electronic instrument cluster (EIC) 176 includes a segmented display on the tractor dashboard for displaying the numerals 1 through 8 with an "H" or an "L" to fully indicate the selected gear speed. The electronic instrument cluster is connected to microprocessor 80 via serial data links and includes sensors for sensing various tractor conditions not relevant to the present invention.

The EIC display 176 and a creeper lamp 178 are powered by a voltage +12 VIGN which is available as long as the ignition key is in the "run" position. The ignition switch contact 138 energizes a relay 180 which closes its contacts so that +12 VIGN is derived directly from battery 130. The creeper lamp 178 is turned on by microprocessor 80 when the creeper mechanism is engaged and the microprocessor causes the lamp to flash in the event tests of the creeper mechanism should not be normal.

Insofar as control of the transmission is concerned, the microprocessor 80 produces four output signals. They are the low-level signals C1/C2 and C3/C4 for energizing the solenoids 74 and 76 of the clutch control valves S1 and S3, the low level signal DMPSOL which energizes the solenoid 81 of the dump valve S2, and the high level signal CRPSOL which energizes the solenoid 83 of the creeper valve S4.

Figures 4A, 4B:
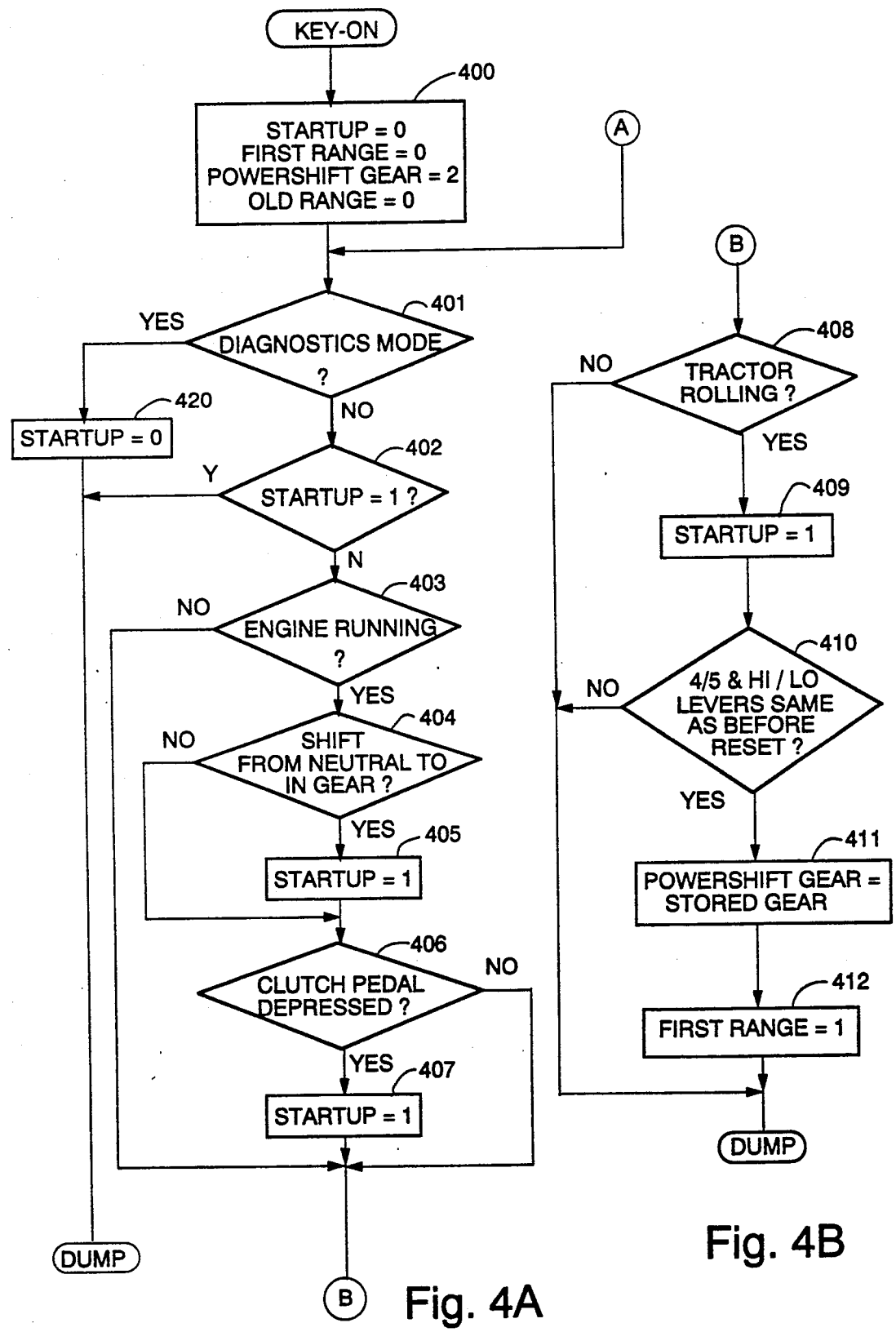
FIGS. 4A and 4B illustrate the Start-Up routine executed by the microprocessor.

Generally speaking, the microprocessor 80 executes a power-on reset followed by an Initialization routine when the ignition switch is turned on. During initialization, two flags designated STARTUP and FIRST RANGE are reset to zero, a memory location POWERSHIFT GEAR is set to the value 2 and a memory location OLD RANGE is set to zero as indicated by step 400 in FIG. 4A.

The flag STARTUP is set during execution of a Startup routine as subsequently described and, when set, indicates that a proper sequence of events has taken place such that the driveline may be engaged, that is, the dump valve solenoid 81 may be de-energized so that the engine and input shaft 10 drive the transmission through clutch C1 or C2. There are different conditions for setting START-UP depending on whether the tractor is, or is not, moving. If the tractor is not moving STARTUP is set if the engine is running and (1) there is a transition of the FNR lever 100 from neutral to forward or reverse or (2) there is a transition of the clutch pedal from a disengaged to an engaged position. STARTUP is always set the first time the Startup routine is executed if the tractor is rolling. Once set, STARTUP remains set until the ignition is turned off or the operator initiates a diagnostic mode.

The flag FIRST RANGE, when set, enables lighting of the EIC display 176. It is set as subsequently described, and once set it remains set until the ignition is turned off. This flag also controls the initial powershift gear selected during startup.

The memory location POWERSHIFT GEAR stores a value of from 1 to 4. This value determines what output signals the microprocessor 80 produces to energize the solenoids 74 and 76. It thus determines the selected powershift gear.

OLD RANGE is a memory location which is used to save an indication of the position of the 4/5 shift lever 92 during a range shift.

The microprocessor program may best be understood by first considering a normal start, that is, the tractor is not moving, the ignition key is turned to the crank position with FNR lever 100 in neutral to start the engine, and the clutch pedal is depressed. The High/-

Low shift lever 92 and the 4/5 shift lever 96 may be in any position. Once the initialization at step 400 has been completed the microprocessor checks a switch (not shown) at step 401 to see if the operator has indicated a desire to enter a diagnostic mode by actuating the switch. If the operator has actuated the diagnostics switch, the program branches to step 420 where STARTUP is cleared before the program moves to a Dump routine described below. The diagnostic mode is not relevant to the present invention and will not be further described.

If the test at step 401 proves false, STARTUP is tested at step 402. The first time step 402 is executed after the ignition key is turned on, STARTUP will be zero since it was reset at step 400 during initialization. The program then tests the output of an engine oil pressure switch 177 (FIG. 3) to see if the engine is running. Assuming a normal start-up, the test at step 403 proves false and the program moves directly to step 408 (FIG. 4B) where the microprocessor senses the output of the speed sensor 154 and compares it with a value START THRESH to determine if the tractor is moving. In this regard, the initial powershift gear selected at start-up is determined as described below by the positions of shift levers 92 and 96 if the tractor is stationary. On the other hand, if the tractor is moving and the shift levers are not shifted, the initial powershift gear selected is determined by steps 409-412 and is the gear in effect at the time the microprocessor is reset as explained in above-referenced application G. Under the assumed conditions the test at step 408 proves false and the program branches directly to the Dump routine illustrated in FIG. 5.

The purpose of the Dump routine is to control the solenoid 81 associated with the dump valve S3, thereby enabling the input shaft 10 to be coupled to output shaft 11 by selectively engaging or disengaging clutches C1-C4.

At step 500, the output of the clutch pedal potentiometer 79 is tested and since it is assumed that the clutch pedal is fully depressed the program branches to step 505 where the microprocessor produces an output signal DUMPSOL to energize solenoid 81. When the solenoid is energized, the hydraulic fluid is dumped through the dump valve S3 thereby ensuring that the clutches C1-C4 are disengaged.

After the clutches C1-C4 are disengaged, the program advances to a Powershift routine as shown in FIG. 6. The Powershift routine is the routine which increments or decrements the value POWERSHIFT GEAR each time the operator depresses one of the powershift push-buttons 112, 114. The Up-Shift push-button switch contacts 166 are tested for a signal level transition at step 600 and the Down-Shift push-button switch contacts 168 are similarly tested at step 601. This is accomplished by sensing the present states of the contacts at steps 600 and 601, saving indications of the states in memory, and comparing the saved indications with the states sensed the next time steps 600 and 601 are executed. Assuming that the operator has not depressed either powershift push-button, the tests at steps 600 and 601 prove false and the program advances to step 700 of the Initial Gear selection routine shown in FIG. 7.

The purpose of the Initial Gear routine is to make an initial powershift gear selection during a start-up so as to give a nearly consistent smooth starting speed without being too slow. Generally speaking, if the 4/5 shift lever 96 is in the "4" position and the High/Low shift lever 92 is in the low position, powershift gear 4 is selected. For all other conditions of the shift levers (excluding neutral) powershift gear 1 is selected. Table II shows the initial gear selection during a normal startup for various positions of the 4/5 and High/Low shift levers.

| ranges levers | | powershift | initial |
|---|---|---|---|
| 4/5 | High/Low | gear | gear |
| 4 | Low | 4 | 4L |
| 5 | Low | 1 | 5L |
| 4 | High | 1 | 1H |
| 5 | High | 1 | 5H |

Figure 7:
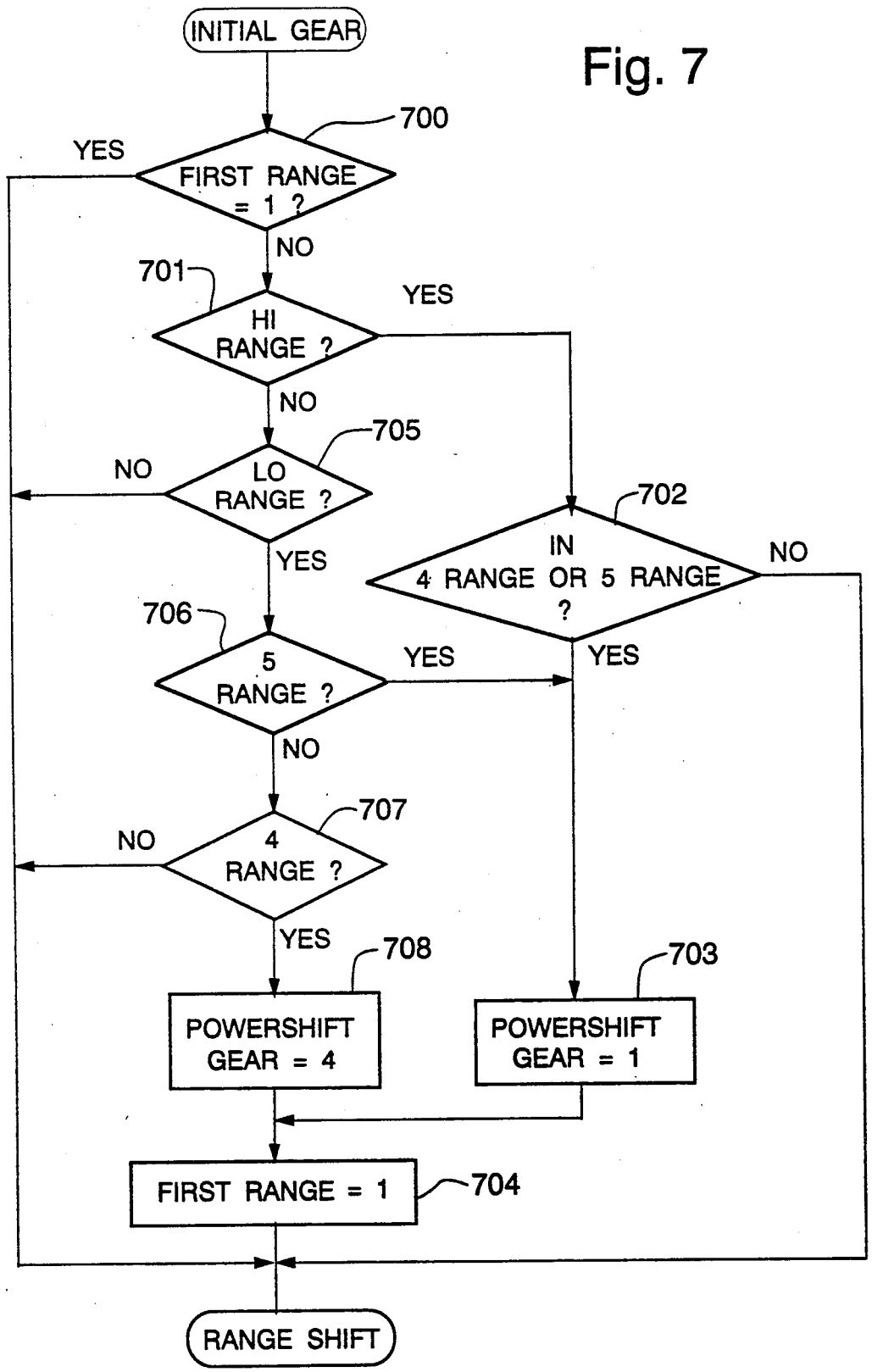
FIG. 7 illustrates a routine for making an initial selection of a powershift gear.

In FIG. 7, the flag FIRST RANGE has not been set so the test of this flag at step 700 proves false. The routine moves to step 701 to check if the High/Low shift lever 92 is set for the high range (switch 158 closed). If it is, the 4/5 shift lever switches 162 and 164 are tested at step 702 to see if the 4/5 shift lever 96 is in either the 4 or 5 position. If it is, location POWERSHIFT GEAR is set to one at step 703 and the flag FIRST RANGE is set at step 704 before an exit is made from the routine. The initial gear selection will thus be 1H or 5H depending on whether the 4/5 shift lever is set to the "4" or "5" position, respectively.

If the test at step 701 shows that the High/Low shift lever is not set for the high range, a test is made at step 705 to see if it is set for the low range (switch 160 closed). Assuming for the moment that the test at step 705 proves true, a test is made at step 706 to see if the 4/5 shift lever is set for the "5" position (switch 164 closed). If it is, the routine branches to step 703 to again select powershift gear 1 and set FIRST RANGE at step 704. The initial gear selection in this case will thus be 5L. On the other hand, if the test at step 706 proves false, the 4/5 lever is tested at step 707 to see if it is in the "4" position (switch 162 closed). If it is, step 708 is executed to set location POWERSHIFT GEAR to four before FIRST RANGE is set at step 704. The initial gear selection in this case is thus 4L.

If the test at step 705 proves false, it means that the High/Low select lever is in its neutral position. In this case an exit is made from the Initial Gear selection routine to a Range Shift routine (FIG. 8) without setting FIRST RANGE or making an initial powershift gear selection since the transmission cannot transmit torque from its input shaft to its output shaft when the High/Low lever is in neutral. The value in POWERSHIFT GEAR continues to hold the value 2 entered therein at step 400.

In like manner, if the test at step 702 or 707 proves false no initial powershift gear selection is made because the transmission cannot transmit torque from the input shaft to the output shaft when the 4/5 shift lever is in neutral. The routine branches to step 805 of the Range Shift routine shown in FIG. 8 with the value 2 still in POWERSHIFT GEAR and FIRST RANGE still reset.

The purpose of the Range Shift routine is to change the selected powershift gear when the 4/5 range shift lever 96 is shifted so as to provide a more gradual speed increase or decrease. That is, when the 4/5 shift lever is shifted from the "4" to the "5" position, the Range Shift routine automatically selects powershift gear 1 by setting location POWERSHIFT GEAR to 1 regardless of its count at the time the lever is shifted. On the other hand, when the 4/5 shift lever is shifted from the "5" to the "4" position the Range Shift routine selects powershift gear 4 by setting POWERSHIFT GEAR to 4. The Range Shift routine also includes "change of mind" logic which permits POWERSHIFT GEAR to be restored to its initial value if the 4/5 shift lever is shifted and then returned to its initial position before the clutch pedal is released.

At step 805 the potentiometer 79 is tested to see if the clutch pedal is released. Since it is assumed that the clutch pedal is depressed, the test at step 805 proves false and the program moves to step 800 where it tests to see if the 4/5 shift lever has been shifted from the 4 to the 5 position. In this regard, the microprocessor 80 saves the status of switches 158, 160, 162 and 164 so that a comparison may be made between the previously sensed status and the present status. Under the assumed conditions, the 4/5 shift lever has not been moved so the test at step 800 proves false. For the same reason, the test at step 801 proves false since the 4/5 shift lever has not been shifted from its "5" to its "4" position. An exit is made from step 801 to the Creeper routine shown in FIG. 9.

The Creeper routine is provided to monitor and control the creeper valve S4 which in turn controls engagement of the creeper gear 54 by actuating piston 82. At step 900, the High/Low shift lever switch 158 is tested to see if the High/Low shift lever is positioned to select the low range. If the High/Low shift lever is not in the low position the creeper gear cannot be engaged. The program jumps to step 902 where the microprocessor resets a CREEPER ON flag to indicate that the creeper solenoid is not energized. At step 902 the microprocessor also sets its output so that the creeper solenoid is de-energized before the routine moves to step 906.

If the test at step 900 proves true, the creeper switch contacts 170 are tested for a transition at step 901. Assuming the operator has not actuated the creeper switch the program branches directly to step 906.

The Creeper routine is fully disclosed and claimed in above-referenced application H-1.

Step 906 is executed to send the signals C1/C2 and C3/C4 to the solenoids 74 and 76 to actuate the clutch valves C1-C4 according to the value stored at location POWERSHIFT GEAR. At this point POWERSHIFT GEAR contains the value entered therein at step 703 or 708 if the range shift levers 92 and 96 are both out of neutral or the value 2 (from step 400) if one or both of the shift levers is in neutral. However, the drive train is not engaged because the dump valve is in its dump position.

Execution of step 906 completes one cycle of the microprocessor program and it branches back to step 401 (FIG. 4). Assuming for the moment that the engine has not yet started and the operator does not shift any levers or release the clutch pedal, the program is repeated as described above with one possible exception. In FIG. 7, if neither the High/Low shift lever 92 nor the 4/5 shift lever 96 was in neutral, the flag FIRST RANGE was set at step 704 during the first execution of the program. Therefore, on the second and subsequent executions of the program a jump is made from step 700 to the Range Shift routine without changing the value entered into POWERSHIFT GEAR during the first execution.

On the other hand, if either of the shift levers 92 or 96 was in neutral during the first execution the flag FIRST RANGE was not set. Therefore, if the next action of the operator is to move one or both of the shift levers so that neither is in neutral then the flag FIRST RANGE is set at step 704 and location POWERSHIFT GEAR is changed at step 703 or 708, depending on the lever positions, the next time the Initial Gear routine is executed.

Assume now that the engine starts. After the engine is running, the next test of switch 177 at step 403 proves true and at step 404 the FNR shift lever switch is tested to see if the lever has been shifted from neutral, required to start the engine, to either forward or reverse. Assuming there has been no shift, the program moves directly to step 406.

At step 406, the output of clutch pedal potentiometer 79 is tested to see if the clutch pedal is depressed. Assuming that the clutch pedal is still depressed, STARTUP is set at step 407 and the test at step 408 proves false so the routine moves to step 500. Since the clutch pedal is still depressed, the program moves to step 505 as previously described to energize the dump valve solenoid 81. The program sequences through the remaining steps as described above.

If the operator starts the engine without depressing the clutch pedal and he first moves the FNR shift lever out of neutral to either the forward or reverse position the program detects the shift at step 404 and sets the flag STARTUP at step 405. The depressed clutch pedal test at step 406 proves false and when the test is made at step 408 to see if the tractor is moving the program jumps to step 500. The clutch pedal is released so the test at step 500 proves false and the program proceeds to step 501 where the neutral switch 140 is tested and found to be open. The program then tests STARTUP at step 502 and since the flag is now set the program tests at step 503 for operation of the Diagnostic mode switch. Assuming the switch is not actuated, the program moves to step 504 where the microprocessor de-energizes solenoid 81 of the dump valve S3. Hydraulic fluid is thus applied through the dump valve to selected ones of the clutches C1-C4 thereby coupling the input shaft to the transmission gearing. The particular clutches energized depends on the powershift solenoid commands set up for energizing the solenoids 74 and 76 of valves S1 and S2 the last time step 906 was executed. Since the flag STARTUP was set at step 405, any subsequent executions of the program find the flag set when step 402 is executed so that steps 403-407 are skipped.

Figure 8:
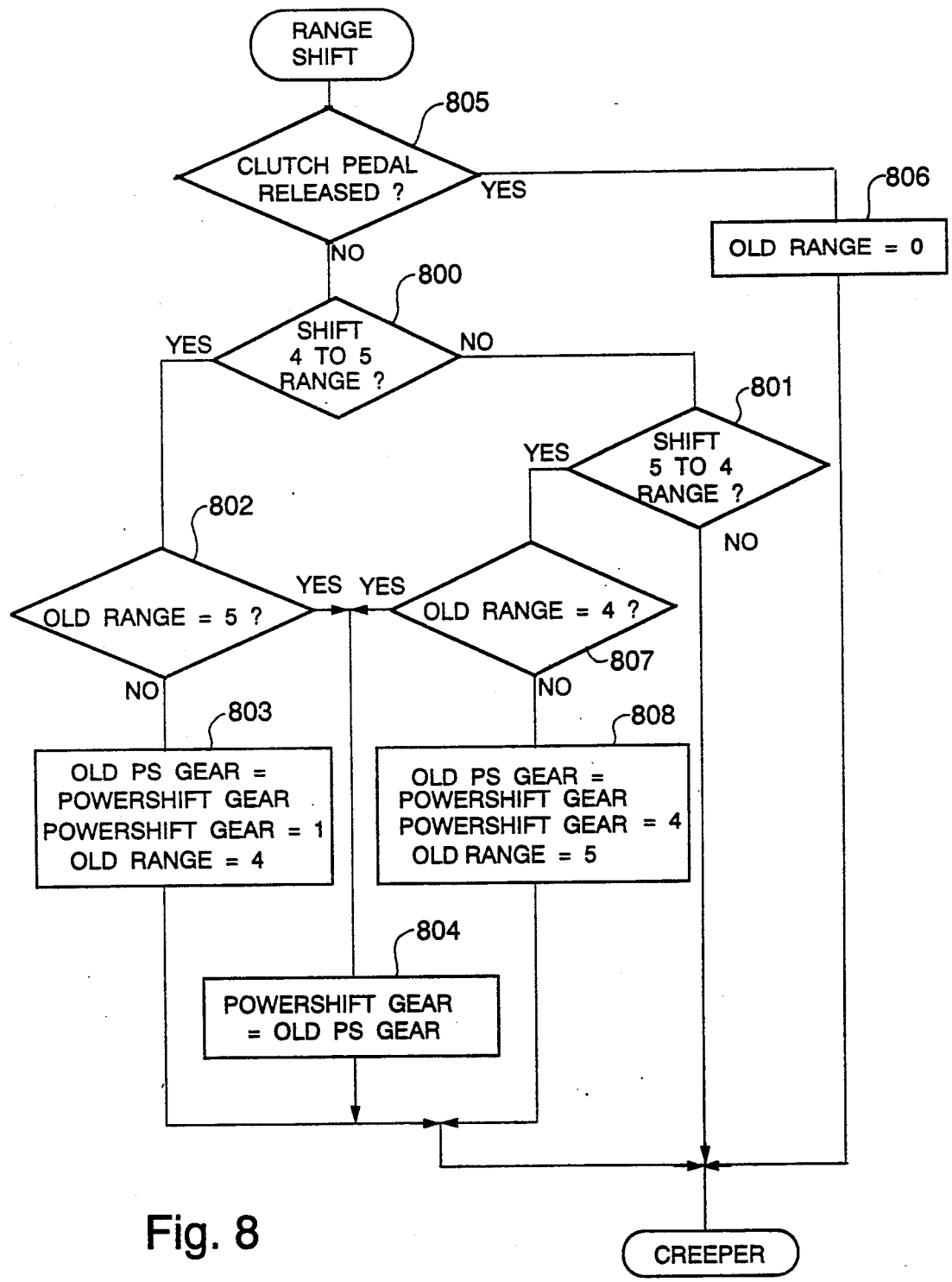
FIG. 8 illustrates a routine for changing powershift gear selection in response to shifting of a range shift lever.
Figure 9:
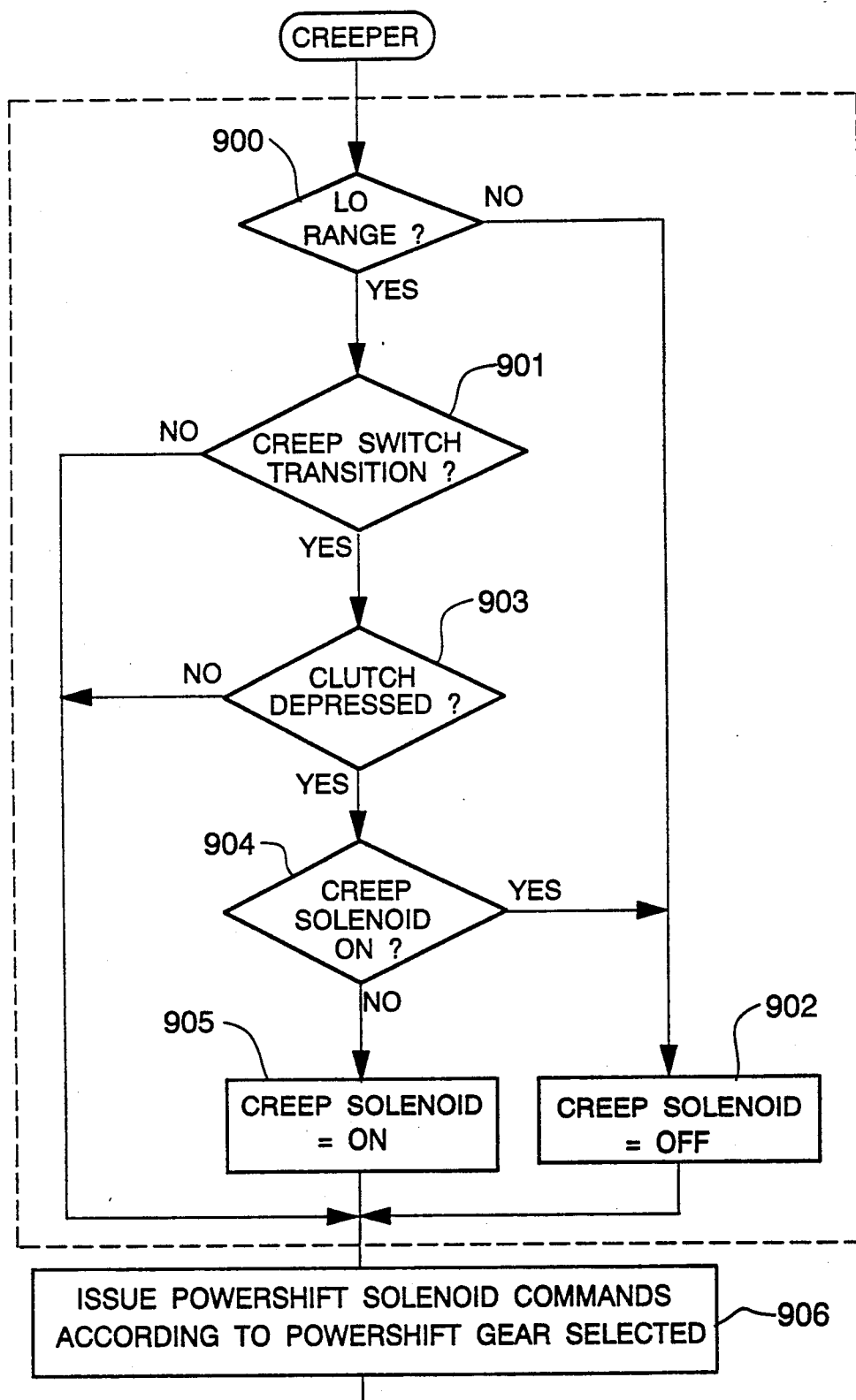
FIG. 9 illustrates a routine for controlling a creeper gear.

Once the flag STARTUP is set as described above, the program follows a sequence which comprises steps 401, 402, the Dump routine of FIG. 5, the Powershift routine of FIG. 6, step 700, the Range Shift routine of FIG. 8 and the Creeper routine of FIG. 9.

Each execution of the Dump routine sets the output to the dump valve solenoid 81 so that hydraulic fluid is supplied to clutches C1-C4 and the driveline remains engaged. The driveline is disengaged only if the clutch is depressed, the FNR shift lever is moved to neutral, or the diagnostic mode switch is actuated.

Each execution of the Powershift routine will vary depending on whether or not a powershift push-button 112, 114 is actuated. If neither push-button is actuated, steps 600 and 601 are executed as described above and location POWERSHIFT GEAR remains unchanged. If the Up-Shift push-button 112 is actuated, the test at step 600 proves true. The Down-Shift push-button 114 is tested at step 608 to make sure that both powershift push-buttons 112 and 114 are not being pressed. If the test at step 608 proves true the program jumps to the Initial Gear routine without changing POWERSHIFT GEAR. If the test at step 608 proves false then the program proceeds to step 602. POWERSHIFT GEAR is tested at step 602 and if it is less than 4 it is incremented at step 603 and a location OLD RANGE is cleared at step 606. If POWERSHIFT GEAR is already at 4, the test at step 602 proves false and the program moves to step 601 without incrementing POWERSHIFT GEAR.

If the Down-Shift push-button is depressed, the action is detected at step 601 and the program branches to step 604 where POWERSHIFT GEAR is tested to see if it is greater than 1. If it is, POWERSHIFT GEAR is decremented at step 605 and location OLD RANGE is cleared at step 607. If the test at step 604 shows that POWERSHIFT GEAR is already 1, it is not modified.

The Range Shift routine comes into play only if there is a shift of the 4/5 shift lever 96 from the 4 range to the 5 range or the 5 range to the 4 range. Its purpose is to make the shift as smooth as possible, that is, make the change in gear speed ratios as small as possible when a shift is made between the two ranges. It does this by selecting the highest powershift gear (4) when there is a shift from the 5 to the 4 range and selecting the lowest powershift gear (1) when there is a shift from the 4 to the 5 range. The Range Shift routine also includes logic for restoring the value in POWERSHIFT GEAR in the event the operator depresses the clutch pedal, shifts the 4/5 shift lever, then changes his mind and returns the 4/5 shift lever to its original position before releasing the clutch.

Depression of the clutch pedal is detected at step 805 and the program moves to step 800. Assuming no change in the position of the 4/5 shift lever, the tests at steps 800 and 801 both prove false and POWERSHIFT GEAR is not changed when the routine is executed. If there is a shift from the 4 to 5 range, this is detected at step 800 and POWERSHIFT GEAR is set to 1 at step 803 since OLD RANGE will contain a value of zero when the test is made at step 802. On the other hand, if there is a shift from the 5 range to the 4 range, this is detected at step 801 and POWERSHIFT GEAR is set to 4 at step 808 since OLD RANGE will contain a zero when the test is made at step 807.

The advantage of the range shift logic is evident from Table I. Assume that the transmission is in, for example, gear 5L and the 4/5 shift lever is moved to the 4 range. Without the range shift logic, the powershift gear selection would remain unchanged so that gear 1L would be selected. The gear speed ratio would change from 3.60 to 8.51. On the other hand, with the range shift logic in effect, the powershift gear is changed from 1 to 4 when the 4/5 shift lever is moved so that gear 4L is selected. In this case the gear speed ratio changes from 3.60 to 4.66 thus providing a smaller change in the gear speed ratio.

Similar range shift logic is not provided for the High/Low shift lever 92. When this lever is shifted the powershift gear selection remains unchanged so that a shift of eight gears is effected with each shift of the lever. However, as subsequently described with respect to FIG. 10, range shift logic may be provided for both the 4/5 shift lever and the High/Low shift lever.

The advantage of the change of mind logic may be appreciated by considering the following example. Assume that the transmission is in gear 8L, that is, the High/Low shift lever is in the low range, the 4/5 lever is in the 5 range, and powershift gear 4 is in effect. A shift of the 4/5 lever to the 4 range results in selection of gear 4L since the range shift logic selects the highest powershift gear when the 4/5 shift lever is shifted to the 4 range. Now, if the 4/5 shift lever is shifted back to the 5 range, the transmission is placed not in original gear 8L but instead enters gear 5L since the range shift logic selects powershift gear 1 when the 4/5 shift lever is shifted to the 5 range. Therefore, if an operator should shift the 4/5 shift lever from the 5 to the 4 range and then decide, before he releases the clutch pedal, that he wants to go back to the previous gear, the shift back to the 5 range results in a sudden unexpected change in speed. The change of mind logic prevents this by saving the powershift gear value in effect at the time the clutch pedal was last released, and if, while the clutch pedal is depressed, the 4/5 select lever is shifted and then returned to its previous position before the clutch pedal is released, the saved powershift gear value is used.

In FIG. 8, if a shift from the 4 to 5 range is detected at step 800, the value OLD RANGE is tested at step 802 to see if it is equal to range 5. OLD RANGE is always reset to zero when the clutch pedal is released so during the first execution of the Range Shift routine after the pedal is depressed the test at step 802 proves false. At step 803 location OLD PS GEAR is set to the value in POWERSHIFT GEAR, POWERSHIFT GEAR is set to 1 and OLD RANGE is set to 4. An exit is then made to the Creeper routine.

The next time (or times) the Range Shift routine is executed, and assuming no further shifting of the 4/5 shift lever only steps 805, 800 and 801 are executed and all tests prove false so nothing happens. If the operator releases the clutch pedal, as in a normal shift, the release of the clutch pedal is detected at step 805, OLD RANGE is reset at step 806 and the driveline is engaged in the new gear (5L) at step 504. On the other hand, if the operator should change his mind and move the 4/5 shift lever back to the 4 range before releasing the clutch, this second shift is the shift detected at step 801. At step 807 OLD RANGE is tested to see if it is equal to 4. This value was set in OLD RANGE at step 803 so the test proves true and the routine branches to step 804 where OLD PS GEAR, the powershift gear value at the time of the clutch depression, is transferred to POWERSHIFT GEAR. Therefore, when the clutch pedal is released the same powershift gear that was in effect before the shift becomes the selected powershift gear.

The change of mind logic is effective even if the operator changes his mind after partially releasing the clutch pedal provided he does not permit it to travel more than about 55% of the distance from the fully depressed position to the fully released position. The microprocessor memory stores a value PCLUTCH_THR representing the 55% point. At step 805 the microprocessor samples the output from the clutch pedal potentiometer 79, digitizes it, and compares the digital value with PCLUTCH_THR to determine if the clutch has been released too far to permit the operator to change his mind regarding the shift.

A shift from the 5 to 4 range is accomplished in a similar manner, the primary difference being that OLD RANGE is set to 5 and POWERSHIFT GEAR is set to 4 at step 808.

The Creeper routine controls energization of the creeper solenoid 83 which controls engagement of the creeper gear 54. As explained in copending application H-1, the Creeper routine also monitors the creeper solenoid current to provide for a safe and orderly disengagement or inhibiting of creeper gear operation when the monitored conditions indicate a failure or likelihood of failure.

Figure 10:
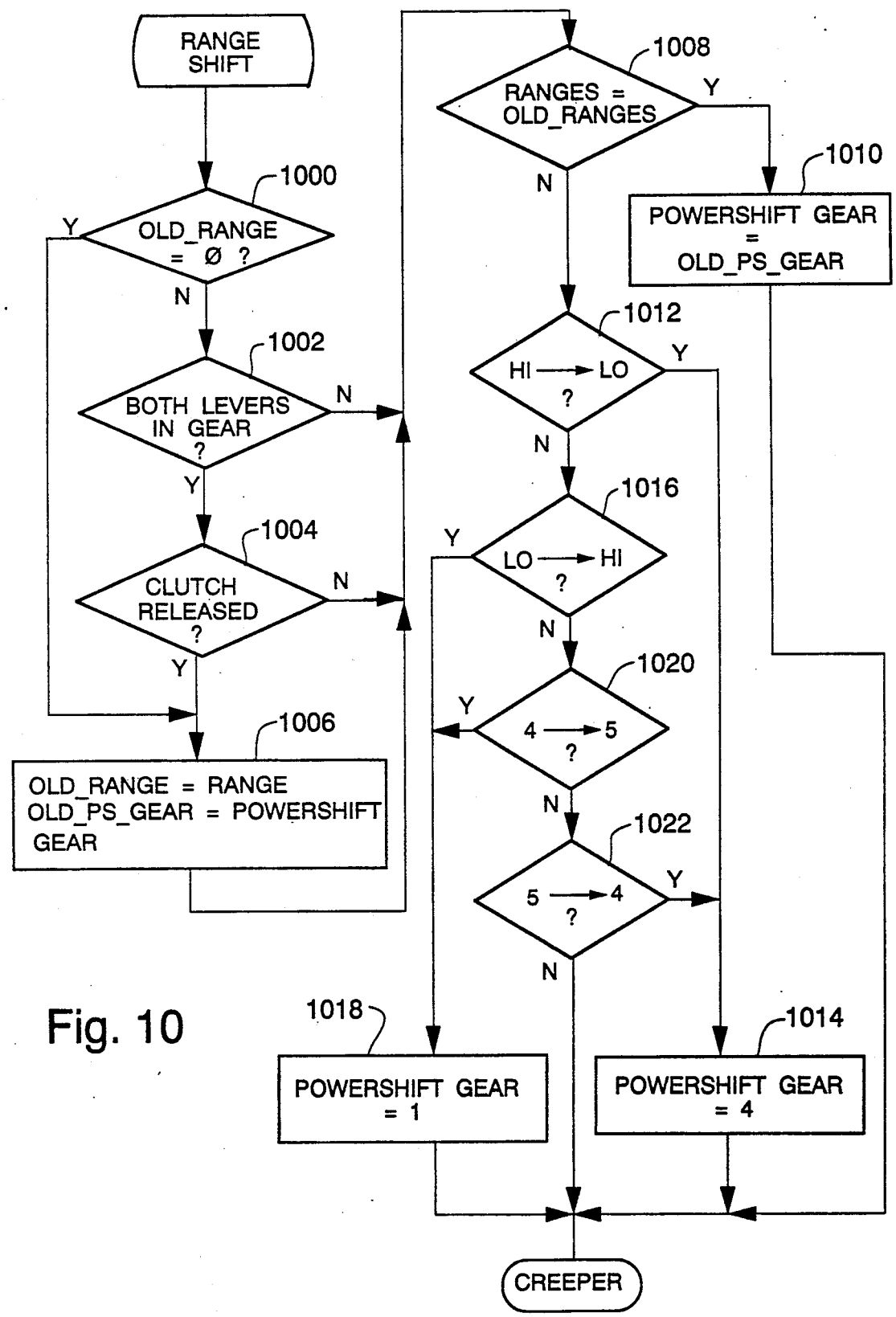
FIG. 10 illustrates a routine for changing powershift gear selection in response to the shifting of either one, or both, of two range shift levers.

FIG. 10 shows an alternative routine which provides powershift gear selection if either a 4/5 or High/Low range shift, or both, occur during a single clutch depression. If both occur, the powershift gear selection is determined by the movement of the High/Low lever only.

In FIG. 10, the Range Shift routine begins at step 1000 by testing location OLD_RANGE for a value of zero. OLD_RANGE will contain a value of zero only if it is reset at step 606 or 607 because one of the powershift push-buttons 112, 114 is pressed. Assuming for the moment that OLD_RANGE=$\phi$ the routine jumps from step 1000 to step 1006 where OLD_RANGE is set to a value (RANGE) representing the present position of the 4/5 and High/Low shift levers 96 and 92. Step 1006 also saves POWERSHIFT GEAR at location OLD_PS_GEAR.

At step 1008 RANGE is compared to OLD_RANGE and since they were set equal to each other at step 1006 the equality test at step 1008 proves true. The value in OLD_PS_GEAR is returned to POWERSHIFT GEAR at step 1010 and an exit is made to the Creeper routine. Thus, if a powershift push-button 112 or 114 is pressed to change powershift gears, there is no change in the selected powershift gear during the first execution of the Range Shift routine following the pressing of the push-button.

Assuming no further actuation of the powershift push-buttons, the test at step 1000 will prove false the next time the Range Shift routine is executed because OLD_RANGE was set to a value other than zero the first time the routine was executed. Therefore, both the 4/5 and High/Low shift levers are tested at step 1002 to see if both of the levers are in gear, that is, neither is in its neutral position. If they are not both in gear the routine jumps to step 1008, executes step 1010 and exits to the Creeper routine.

If the test at step 1002 shows that both levers are in gear, the output of the clutch pedal potentiometer 79 is sampled at step 1004 to determine if the clutch pedal is released. Assuming the operator has not yet depressed the clutch pedal, the test at step 1004 proves false and again steps 1006, 1008 and 1010 are executed before an exit is made to the Creeper routine. On the other hand, if the clutch pedal is depressed the routine jumps from step 1004 to step 1008 and when the test at step 1008 proves true step 1010 is executed before an exit is made to the Creeper routine.

Assume now that the operator shifts either one or both of the 4/5 and High/Low shift levers while depressing the clutch pedal, both of the levers ending up in a position other than neutral. The test at step 1000 proves false, the test at step 1002 proves true, and the test at step 1004 proves false so the routine moves to step 1008. This time, when the microprocessor senses the shift lever positions and compares them with the former shift lever positions, as represented by the contents of OLD_RANGE, the test for equality proves false and the routine advances to step 1012.

The High/Low shift lever is tested at step 1002 to see if the lever has been shifted from high to low. This may be done by sampling the state of switch 160 (or 158) and comparing it with a saved previous sample. If the lever has been shifted, POWERSHIFT GEAR is set to 4 at step 1014. If the test at step 1012 proves false, the High/Low shift lever is tested at step 1016 to see if it has been shifted from the low to the high range. If it has, POWERSHIFT GEAR is set to 1 at step 1018.

If the High/Low shift lever has not been shifted from low to high, the test at step 1016 proves false and the program moves to step 1020 where the 4/5 shift lever is checked for a shift from the 4 to the 5 range. If such a shift has occurred, POWERSHIFT GEAR is set to 1 at step 1018.

If the test at step 1020 proves false, the 4/5 shift lever is tested at step 1022 for a shift from the 5 to the 4 range. If such a shift has occurred, POWERSHIFT GEAR is set to 4 at step 1014. On the other hand, if the test at step 1022 proves false an exit is made to the Creeper routine without changing POWERSHIFT GEAR.

Referring to Table I, assume that the transmission is in 5H and the High/Low shift lever 92 is shifted to the low position. With range shift logic as shown in FIG. 8, a shift would be made to gear 5L and the gear speed ratio would change from 1.16 to 3.60. On the other hand, with range shift logic as shown in FIG. 10, a similar shift of the High/Low shift lever would result in a shift from 5H (ratio 1.16) to 8L (ratio 1.97) thus giving a smaller change in tractor speed and a much smoother movement of the tractor. Like FIG. 8, the range shift procedure of FIG. 10 selects the lowest powershift gear when the new lever positions will select a higher gear range and selects the highest powershift gear when the new lever positions will select a lower gear range. However, the routine of FIG. 10 does this when either the High/Low or 4/5 shift lever is shifted while the routine of FIG. 8 does it only when the 4/5 shift lever is shifted. Both routines, in addition to reducing the speed change during range shifting, minimize wear of transmission components.

If the operator should depress the clutch pedal, shift either one or both of the 4/5 and High/Low shift levers, then change his mind and shift the levers back to their original positions before releasing the clutch pedal beyond the threshold point defined by PCLUTCH_THR, the routine of FIG. 10 will cause the powershift gear in effect before the shift to be in effect after the clutch pedal is released. At the time the clutch pedal is depressed, OLD_RANGE and OLD_PS_GEAR hold indications of the positions of the shift levers and the powershift gear in effect, these indications having been saved at step 1006 the last time that step was executed before the clutch pedal was depressed. While the clutch pedal is depressed below the point PCLUTCH_THR step 1006 is not executed so the indications are saved. When the operator shifts the shift levers back to the positions they held prior to clutch pedal depression, the test at step 1008 proves true. The indication in OLD_PS_GEAR is transferred back to POWERSHIFT GEAR at step 1010. Thus, when the clutch pedal is released the shift lever selection and powershift gear in effect prior to depression of the clutch pedal are the shift lever selection and powershift gear in effect when the pedal is released.

While a preferred embodiments of the invention have been described in specific detail, it will be understood that various modifications and substitutions may be made in the described embodiments without departing from the spirit and scope of the invention as defined by the appended claims. It is intended therefore to be limited only by the scope of the appended claims.

The invention in which an exclusive property or privilege is claimed is defined as follows.

1. In a vehicle transmission system having at least a first coupler responsive to movement of a range shift lever mechanically linked thereto between first and second positions for selecting a first or a second range of gears said second range of gears being higher than said first range, a microprocessor responsive to actuation of powershift switches for energizing a plurality of electro-hydraulic powershift clutches to thereby select one powershift gear within the selected range, and a clutch pedal movable between a depressed position and a released position for controlling the flow of hydraulic fluid to said powershift clutches, the improvement comprising:

means for sensing the position of said range select lever;
   first means in said microprocessor for detecting a shift of said range select lever from one of said positions to the other; and,
   second means in said microprocessor responsive to said first means for generating signals to energize said powershift clutches to select the lowest powershift gear when said range shift lever is shifted from said first to said second position and the highest powershift gear when said range shift lever is shifted from said second to said first position, said lowest and highest powershift gears being separated by a least one other powershift gear.

2. The improvement as claimed in claim 1 wherein the transmission system includes a second coupler responsive to movement of a second range shift lever mechanically linked thereto between first and second positions for selecting a low or a high range of gears in either said first or said second range, said improvement further comprising:

third means for sensing the position of said second range shift lever;
   fourth means in said microprocessor responsive to said third means for detecting a shift of said second range shift lever from one of its positions to the other;
   fifth means responsive to said fourth means for generating signals to energize said powershift clutches to select the lowest powershift gear when said second range shift lever is shifted from its first to its second position and the highest powershift gear when said second range shift lever is shifted from its second to its first position; and,
   means responsive to said first means for inhibiting said fifth means if both of said range shift levers are shifted during a single depression of the clutch pedal.

3. A transmission system for controlling the transmission of torque from an input shaft to an output shaft said transmission system including:

at least one shiftable coupler mechanically linked to a range shift lever;
   a plurality of electro-hydraulic powershift clutches which, together with said coupler, select a gear speed ratio between said input and output shafts, at least one of said powershift clutches being located between the coupler and the input shaft whereby said coupler is selectively driven through said one powershift clutch;
   a dump valve through which hydraulic fluid is applied to or released from said powershift clutches;
   a clutch pedal, said clutch pedal when in a fully depressed position permitting synchronized shifting of said coupler;
   means for sensing that said clutch pedal has been depressed at least as far as a threshold point, said threshold point being between a released position and said fully depressed position; and,
   means responsive to said sensing means for controlling said dump valve to release fluid from said powershift clutches as said clutch pedal is depressed past said threshold point.

4. A transmission as claimed in claim 3 wherein said threshold point is separated from said fully depressed position by about 12% of the distance between said released position and said fully depressed position.

5. A transmission system as claimed in claim 4 wherein at least a second of said powershift clutches is located between said coupler said output shaft so as to be selectively driven through said coupler.

6. A transmission as claimed in claim 5 wherein said coupler is shiftable to drive said second powershift clutch in a forward or a reverse direction.

7. A transmission as claimed in claim 5 wherein said coupler is shiftable to drive said second powershift clutch at a first or a second speed relative to said first powershift clutch.

8. A transmission as claimed in claim 7 and further comprising a second shiftable coupler located between said first and second powershift clutches, said second coupler being shiftable to drive said second powershift clutch in a forward or a reverse direction.

9. In a vehicle transmission system having at least a first coupler responsive to movement of a range shift lever mechanically linked thereto between first and second positions for selecting a first or a second range of gears said second range of gears being higher than said first range, a microprocessor responsive to actuation of powershift switches for energizing a plurality of electro-hydraulic powershift clutches to thereby select one powershift gear within the selected range, and a clutch pedal movable between a depressed position and a released position for controlling the flow of hydraulic fluid to said powershift clutches, the method comprising:

sensing the position of said range select lever;
   detecting a shift of said range select lever from one of said positions to the other; and,
   generating signals to energize said powershift clutches to select the lowest powershift gear when said range shift lever is shifted from said first to said second position and the highest powershift gear when said range shift lever is shifted from said second to said first position, said lowest and highest powershift gears being separated by a least one other powershift gear.

10. The method as claimed in claim 9 wherein the transmission system includes a second coupler mechanically linked to a second range shift lever movable between first and second positions for selecting a low or a high range of gears in either said first or said second range, said method further comprising:

sensing the position of said second range shift lever;
   detecting a shift of said second range shift lever from one of its positions to the other;
   generating signals to energize said powershift clutches to select the lowest powershift gear when said second range shift lever is shifted from its first to its second position and the highest powershift gear when said second range shift lever is shifted from its second to its first position; and,
   inhibiting generation of signals according to movement of said second range shift lever if both of said range shift levers are shifted during a single depression of the clutch pedal.

* * * * *